Nov. 22, 1955 G. O. PRINGLE 2,724,199
SELECTIVE MULTIPLE HINGED PASTURE GATE
Filed Jan. 18, 1954
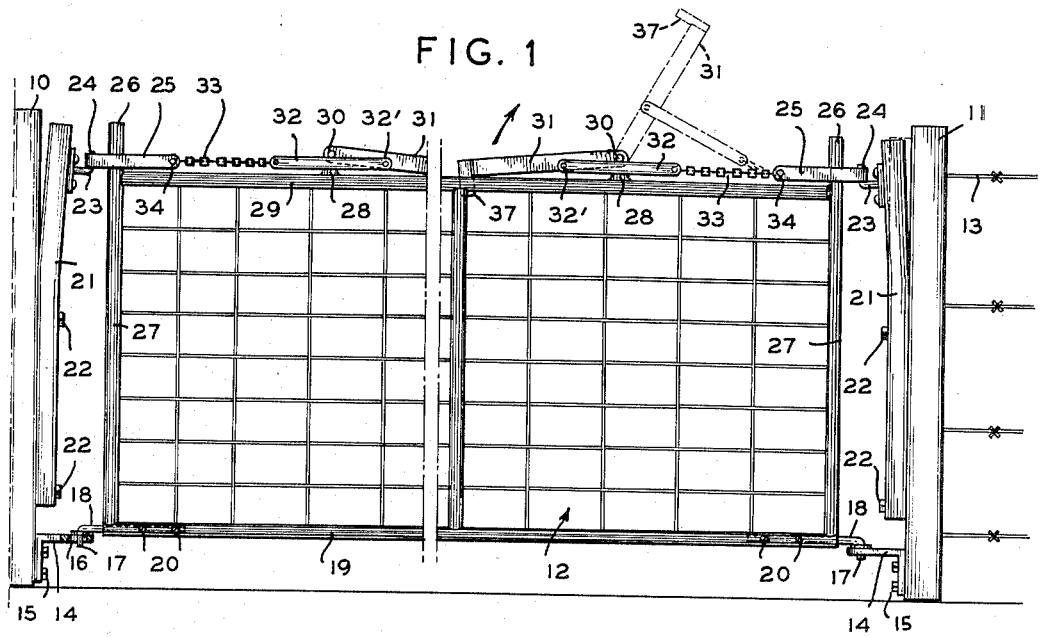
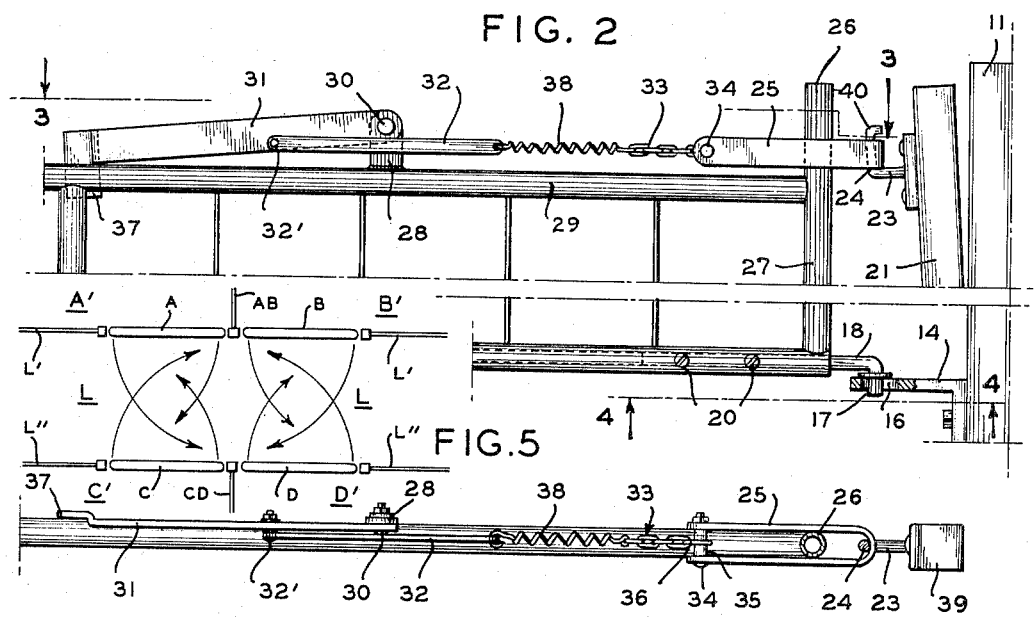
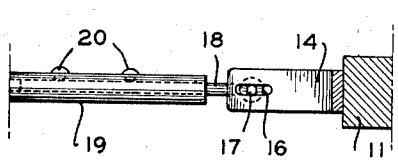
INVENTOR
GEORGE O. PRINGLE
BY
ATTORNEY

United States Patent Office 2,724,199
Patented Nov. 22, 1955

2,724,199

SELECTIVE MULTIPLE HINGED PASTURE GATE

George O. Pringle, Columbia, Mo.

Application January 18, 1954, Serial No. 404,546

10 Claims. (Cl. 39—59)

The present invention relates to fencing and more particularly to a gate panel providing a section of fencing which may be opened and closed.

Heretofore in animal husbandry, fields have been fenced to provide pasturage and gates have been used to provide access to such fields from a herding lane or from one field to another. Although various types of gates and fences have been used, they have not been entirely satisfactory since the gate posts would move due to freezing and thawing of the soil, the tensile strain on the wires leading to such gate posts, and the gravitational forces on the gate. As a result, a gate might work perfectly one day with its latches operating efficiently, but the next day such latches might be entirely out of alignment and the gate might swing open of its own accord. The gate posts frequently would vary from a vertical position causing the gate to drag on the ground, and the weight of the gate would frequently cause the gate itself to sag, even though some diagonal bracing was provided.

It is an object of the present invention to overcome the difficulties enumerated above and to provide a gate structure to close an access opening and to serve as a section of a fence.

A further object is to provide a gate which transmits the tension of the fencing wires between the gate posts without requiring complicated overhead construction.

Another object is to provide a gate structure which is adjustable to take care of variations in the position of the gate posts.

A further object is to provide a gate latch which is maintained under tension and accommodates for variations due to temperature and climatic conditions affecting fences.

Another object is to provide a gate which may be pivoted from either end and swingable in either direction for facilitating movement of equipment or animals through the opening closed by the gate.

The present invention includes a relatively rigid panel of substantial length and height positioned between upright gate posts adjacent the ends of the panel. At the lower corners of the panel L-shaped pivot rod members are telescopically connected to the panel for lengthwise adjustment relative thereto with one leg of the L-shaped rod projecting downwardly, while the gate post is provided with a horizontally extending member having a closed slot through which the downwardly projecting portion of the L-shaped rod extends to provide a lost motion pivotal connection. J-shaped brackets are mounted at the upper ends of the posts and a U-shaped member embraces the stem of the J-shaped bracket with the legs of the U-shaped member embracing a portion of the panel and projecting toward the other post. Means are provided for producing a tension on the U-shaped member by reacting between the panel and the J-shaped bracket to support the panel in position. One form of tension means may include a toggle lever system connected to the U-shaped member to provide the tension and also to provide lost motion for releasing the U-shaped member from its associated J-shaped bracket to permit that end of the panel to be swung about the other end of the panel. A spring may be provided between the U-shaped member and the toggle tension producing means or a spring means may be provided between the J-shaped bracket and its supporting gate post to accommodate variations in spacing of the gate posts. Also, it will be evident that both ends of the panel may be similarly supported so that the gate may be swung about either end as a pivot.

Further objects and advantages of the invention will be apparent from the following description taken in conjunction with the drawing wherein:

Fig. 1 is an elevation of one modification of the gate construction showing the cantilever spring on the gate post;

Fig. 2, an enlarged elevation of a modification similar to Fig. 1 but including an additional coil spring for obtaining other spring characteristics;

Fig. 3, a top partially sectional view of a further modification taken on a line corresponding to line 3—3 of Fig. 2 in which a tension spring is shown and the gate posts are rigid;

Fig. 4, a fragmentary section bottom view taken on line 4—4 of Fig. 2; and

Fig. 5, a diagrammatic plan view of an arrangement of fences and gates providing communication between fields.

With reference to Fig. 1, upright gate posts 10 and 11 projecting from the ground in the usual manner support a gate panel 12 having an outer framework with mesh wire stretched thereon. Such gate panel controls access through the space between the gate posts. Conventional wire fencing 13 such as barbed wire or the like may extend from the gate posts in a wall known manner.

Mounted upon the lower end of gate post 10 is an L-shaped bracket 14 secured to the post by any suitable means such as lag screws 15, or the like. A slot 16 is provided in the horizontally extended portion of the L-shaped bracket 14 for receiving a downwardly extending fixed pivot means or portion 17 of a bent rod 18 which is telescopically received into bottom tubular frame member 19 of the panel 12 and is fixed in position by means of set screws 20 or the like to provide the telescopic adjustment.

A resilient cantilever or spring member 21 shown as a conventional 2" x 4" timber, is positioned alongside gatepost 10 and is secured at its lower end by lag screws or bolts 22, while the upper end of the spring may move toward and away from the post and is shown spaced therefrom.

A J-shaped pivot 23 is fixed to the upper end of the cantilever spring 21 by any suitable fastening means and the stem 24 thereof projects upwardly and is embraced by a U-shaped pivot means or member 25 which also embraces an upward extension 26 of the panel side member 27 so that the U-shaped member 25 is guided by the extension 26 for maintaining the panel 12 in a definite relation to the J-shaped pivot 23. An upstanding lug 28 projecting upwardly from top rail or bar 29 of the gate panel 12 provides a pivot 30 upon which a hand lever 31 is mounted for swinging movement in substantially the plane of the panel, and a link 32 is pivotally mounted at 32' to the hand lever 31 intermediate the ends of the latter. The pivot 30 is made substantially flat on the side thereof adjacent link 32 so that the link 32 may pass in close relation to the hand lever 31 to avoid any tendency to urge the hand lever to bend transversely of the panel.

Connecting the free end of link 32 and the legs of the U-shaped member 25 is a chain 33 which is fixed to the free end of link 32 and the connection to the U-shaped member 25 is by means of a removable pin or bolt 34 (Fig. 3) which receives spacing elements 35 on opposite sides of one of the links 36 of the chain 33 to provide a proper spacing of the legs of the U-shaped member or yoke 25 to permit longitudinal movement thereof relative to upstanding portion 26 of the side member 27. It will be evident that various adjustments may be obtained by inserting the bolt 34 in a corresponding link 36 of the chain.

The right side of the gate as viewed in Fig. 1 is substantially identical in construction, and corresponding reference numerals indicate the corresponding parts. The hand lever 31 may be provided at its free end with a downwardly extending lug 37 for engagement with the rear side of the top rail 29 to prevent movement of the handle 31 across the plane of the panel and such downwardly extending lug may be provided with a recess for engaging the top rail 29 for additionally retaining the lever 31 in its lowermost position. The lug 37 of the lever may be disengaged from the top rail 29 by a rearward movement slightly bending the lever 31. The pivot 30 of the upstanding lug 28 is so located with respect to the full line position of pivot 32' and the J-shaped bracket 23 that a toggle is formed and the tensile force between pivot 32' and J-shaped bracket 23 is in a line below such pivot 30 making it unnecessary to have any other means for holding the lever 31 in the full line position.

The adjustable L-shaped rods 18 have the downwardly extending projection 17 within the elongated slot 16 and such downwardly extending projection is normally between the ends of the slot as shown in Fig. 1. However, assuming that the right hand lever 31 is moved to its dotted line position, the U-shaped member 25 thereof may be removed from J-shaped bracket 23 and the left cantilever spring 21 will move to the dotted line position moving the left J-shaped bracket 24 therewith thereby bringing the left L-shaped rod 18 to the left extremity of the slot 16. The left L-shaped rod 18 may be so adjusted that the tension on spring 21 will raise the right edge of the panel 12 releasing the downward projection 17 of the right L-shaped rod 18 from the right L-shaped bracket 14, permitting the gate to swing about left J-shaped pivot 24 and the left downward pivot projection 17. Similarly, the gate may be made to swing about the right J-shaped bracket 23 and the right downward extending projection 17 upon release of the left U-shaped member 25.

Referring to Fig. 2, the hand lever 31, link 32, and chain 33 are similar to the structure above, but an additional tension spring 38 is provided between chain 33 and link 32 to provide for additional resilient effect and for possible fatigue of the cantilever spring 21, the other parts being similar to those described above.

The modification shown in Fig. 3 is similar to those disclosed above but the cantilever spring 21 is omitted and the J-shaped bracket 23 is mounted directly upon a gate post 39, the tension spring 38 providing the necesary resilience.

Referring to Fig. 5, an arrangement of fencing is shown in which a cattle herding lane L is provided by means of fences L' and L", with a pair of gates A and C arranged in directly opposite relation in fences L' and L", and another pair of gates B and D are provided in directly opposite relation in fences L' and L" respectively. Dividing fences AB and CD extend laterally outward from a location between gates A and B and gates C and D respectively; the fence L', gate A and dividing fence AB define one corner of a field A', while fence L' dividing fence line AB and gate B define a second field B'. Fence L" gate C and dividing fence CD define a corner of field C', while fence L", gate D and dividing fence CD define a corner of a field D', the other boundaries of the field not being shown. From an inspection of the position of the gates A, B, C, and D, it will be obvious that communication may be provided between any field and any other field or between any possible combination of such fields as well as between either end of the lane and any one of the fields or any possible combination of the fields with either end of the lane.

The present gate arrangement shown in Fig. 5 is especially advantageous to avoid "switch back" in driving cattle into a field. For example, if gate A were hinged at the left end only and cattle were driven from the left end of the lane to be herded to field A', it would be necessary to drive the cattle completely past gate A. Thereafter the gate would be swung across the lane and the cattle would be driven back and the gate A in its position across the lane would guide the cattle to the field A'. With a gate pivoted at only one end, it will be obvious that the herdsmen must move a great distance from one end of the herd to the other end to accomplish driving the cattle into the field A'. With the present invention, the gate A may be pivoted from either end and therefore gate A may be swung about the pivots at the right end of the gate and the cattle being driven from the left end of the lane will be guided directly into the field A' without requiring any "switch back," thereby resulting in a great saving of labor.

The J-shaped and L-shaped bracket gate supporting elements for mounting the gates A, B, C, and D in the full line position, could be arranged to positively support the gates in any of the other positions; it is contemplated that an additional set of bottom L-shaped brackets and top J-shaped brackets may be provided for supporting the swinging end of the gates in their other positions and such variation is within the scope and spirit of this invention.

From the above, it will be evident that applicant's construction is adaptable for any number of uses including a fixed panel in a fence as well as a gate panel and the spring adjustment takes care of most normal variations in the positions of the gate posts 10, 11, or 39, but should the spring not be sufficient, the set screws 20 may be loosened and the L-shaped adjusting rod 18 repositioned to properly support the gate. The chain 36 also provides any necessary adjustment to take care of variations in spring pressure or locations of the J-shaped brackets 23.

A modification of the J-shaped bracket 23 may include a flange 40 (Fig. 2) to prevent unintentional upward movement of U-shaped member 25.

The chain 33 and link 32 may be made as an integral unit if desired. Other means for adjustment of the length thereof may be provided and some adjustment of the L-shaped rods 18 will take care of many variations.

It will be obvious to those skilled in the art, that various changes may be made in the invention without departing from the spirit and scope thereof, and therefore, the invention is not limited by that which is shown in the drawings and described in the specification, but only as indicated in the appended claims.

What is claimed is:

1. A gate comprising a pair of upstanding posts mounted in approximately parallel relation, a cantilever spring mounted on each post with the upper end of the cantilever free to move a limited distance away from the post on which it is mounted toward the other post, the lower portion of each cantilever spring being fixedly secured to its post, an L-shaped bracket mounted on the face of each post adjacent the bottom thereof and extending toward the other post, the horizontal leg of the L-shaped bracket being provided with slot which is elongated in the direction toward the other post, a J-shaped pivot member fixedly secured to the upper portion of the cantilever spring and having its stem projecting upwardly, a gate panel positioned between said post and of a length to close the space between such posts for preventing animals passing through such space, said panel being of a height approximately that of the vertical spacing between the L-shaped brackets and the J-shaped pivots, a bent rod telescopically mounted in each of the lower corners of the panel, for adjustable movement longitudinally thereof; the bent portion of said rod projecting downwardly for reception in the corresponding slot of the horizontal leg of the L-shaped bracket, an upwardly extending projection on each end of the panel extending above the J-shaped pivots, a U-shaped member embracing each upstanding projection with its light portion engaging the corresponding J-shaped pivot, a link extending between the free ends of the legs of each U-shaped member toward the other end of the panel, and a lever pivotally connected intermediate its ends to the other end of the link, an upstanding lug projecting from the upper edge of the panel, the lever being pivotally mounted at one of its ends to the upstanding lug, and means on the other end of the lever for engaging the upper edge of the panel and a side of the panel for limiting movement of the lever in one direction, said means being so positioned that the link and the U-shaped member may be in a direct line from the J-shaped bracket below the pivotal connection of the lever to the upstanding lug.

2. A pasture gate comprising an upright panel, L-shaped pivot rod members mounted upon the lower corners of said panel with one leg of the L-shaped member extending horizontally and the other leg projecting downwardly, the horizontal leg being adjustably mounted in the panel, side members on said panel projecting above the upper edge of such panel, an upwardly projecting lug on said panel spaced inwardly from a side member, an operating handle pivotally mounted on said lug for swinging movement in the plane of the panel, a link pivotally secured to said handle intermediate said lug and the free extremity of the handle, a chain secured to the free end of the link, a U-shaped member embracing the projecting end of the side member, and having the bight of the U-shaped member projectable beyond said side member for pivotal attachment to a pivot, the open end of the U-shaped member being adjustably secured to said chain, the said panel being supported on a member having an opening for receiving the downwardly extending portion of the L-shaped member and the bight of the U-shaped member being operatively connected to an upstanding pivot.

3. The invention according to claim 2 in which a resilient means is provided between said U-shaped member and said panel for accommodating variations.

4. The invention according to claim 2 in which a tension spring resilient means is provided between said U-shaped member and said panel for accommodating variations.

5. A gate panel of generally rectangular form having generally parallel pivot means extending from opposite corners thereof, said pivot means being substantially in the plane of the panel, and pivot embracing means mounted on opposite corners of said panel, said last-mentioned corners being opposed to said first-mentioned corners whereby said gate panel may be supported from one of said pivot means and one of said embracing means.

6. The invention according to claim 5 in which the pivot embracing means are mounted for movement toward and away from one another.

7. The invention according to claim 6 in which the pivot embracing means is movable by yieldable connection to a positively operating mechanism whereby the gate panel will accommodate for variations in spacing of panel supporting structure.

8. The invention according to claim 7 in which the positively operating mechanism is a toggle.

9. A gate panel according to claim 5 for control of the movement of stock and the like with such gate panel being mounted in a confining enclosure so that the gate panel may be opened from either end by pivotal movement in either direction about the pivots at either end.

10. A gate panel of generally rectangular form having generally parallel pivot means extending from the corners thereof, one pair of pivot means mounted at one end of the panel including a fixed pivot means at one corner and a movable pivot means at the adjacent corner of said one end, said movable pivot means being movable toward and away from the other end of the panel and also movable toward and away from the fixed pivot means at said one end, a second pair of pivot means having a fixed pivot means and movable pivot means mounted on the other end of said panel in corresponding relation to said fixed and movable pivot means on said one end of the panel, said movable pivot means at said other end of the panel being movable in a direction toward and away from the said one end of the panel and also being movable toward and away from the fixed pivot at said other end of the panel whereby the panel may be selectively pivoted about either end of said panel.

References Cited in the file of this patent

UNITED STATES PATENTS

| | | |
|---|---|---|
| 686,242 | Alsop | Nov. 12, 1901 |
| 1,038,854 | Corcoran | Sept. 17, 1912 |
| 1,447,016 | Etue | Feb. 27, 1923 |
| 1,508,318 | Hagenbeck et al. | Sept. 9, 1924 |
| 2,050,527 | Grabe | Aug. 11, 1936 |
| 2,504,214 | Miller et al. | Apr. 18, 1950 |
| 2,518,260 | Tilbury | Aug. 8, 1950 |
| 2,538,470 | Peeples | Jan. 16, 1951 |
| 2,569,836 | Tilbury | Oct. 2, 1951 |
| 2,661,557 | Reymann | Dec. 8, 1953 |
| 2,691,359 | Andtiss et al. | Oct. 12, 1954 |

FOREIGN PATENTS

| | | |
|---|---|---|
| 578,603 | France | July 7, 1924 |
| 619,796 | France | Jan. 6, 1927 |
| 899,914 | Germany | Dec. 17, 1953 |